Feb. 25, 1930.  H. H. WHEELER  1,748,593
LABELING AND CARTONING DEVICE FOR PACKAGING MACHINES
Filed June 8, 1927  3 Sheets-Sheet 1
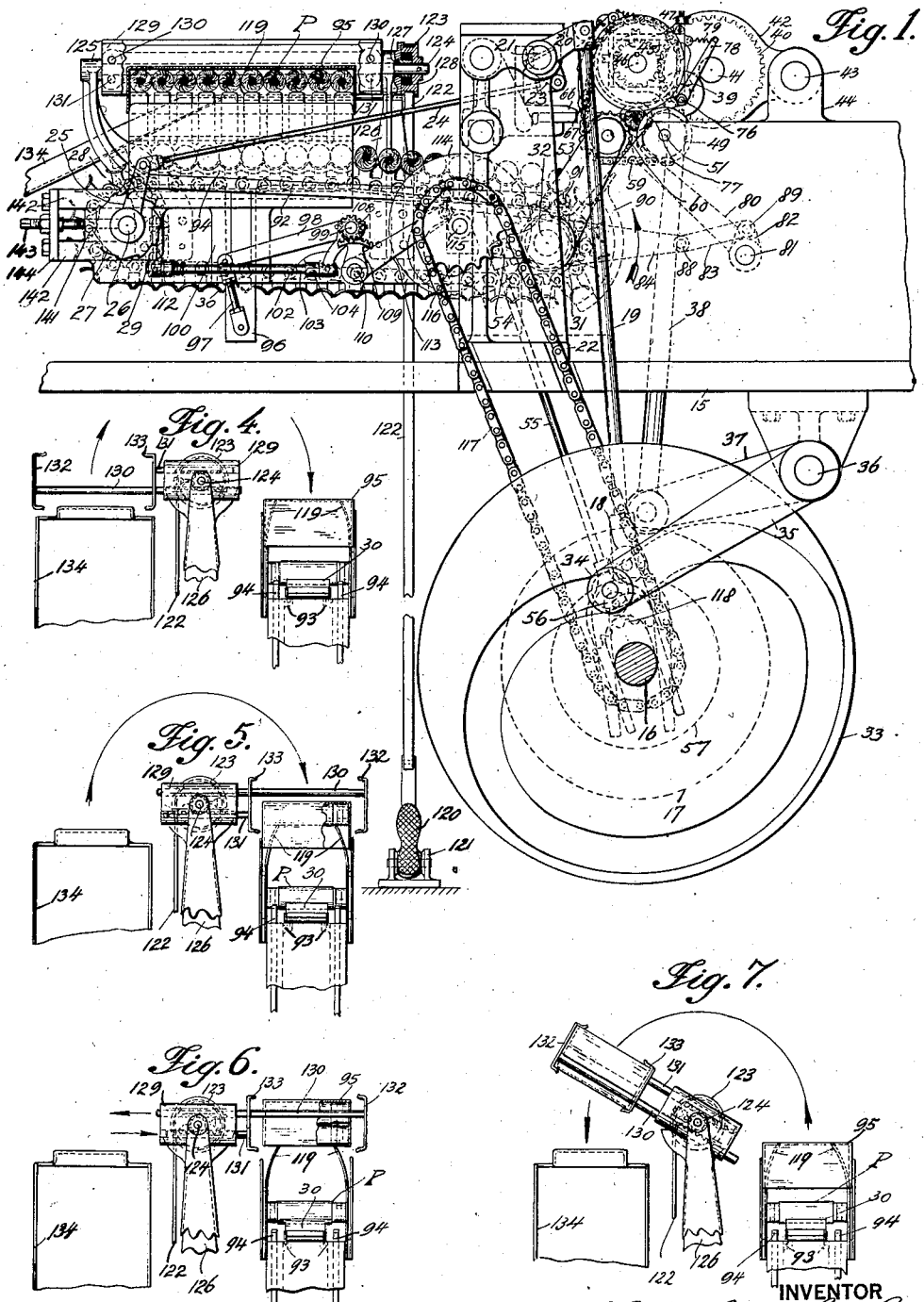
INVENTOR
Henry H. Wheeler
BY Sydney P. Prescott
ATTORNEY

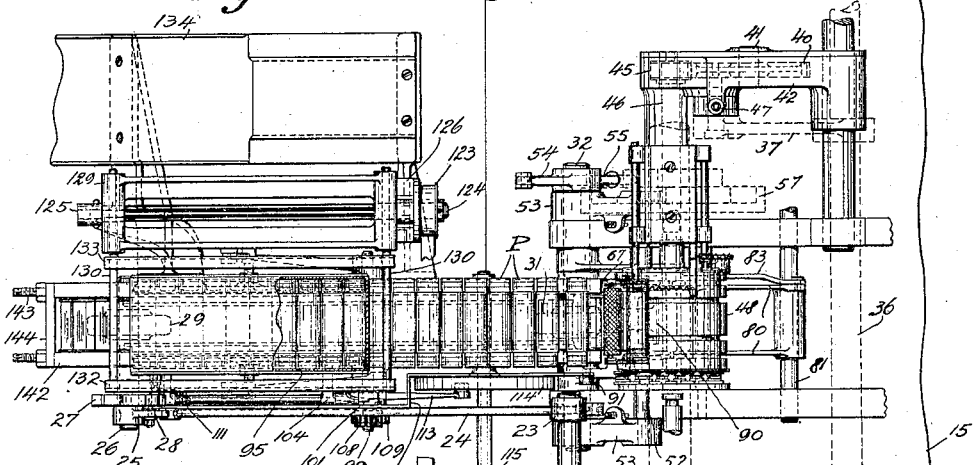
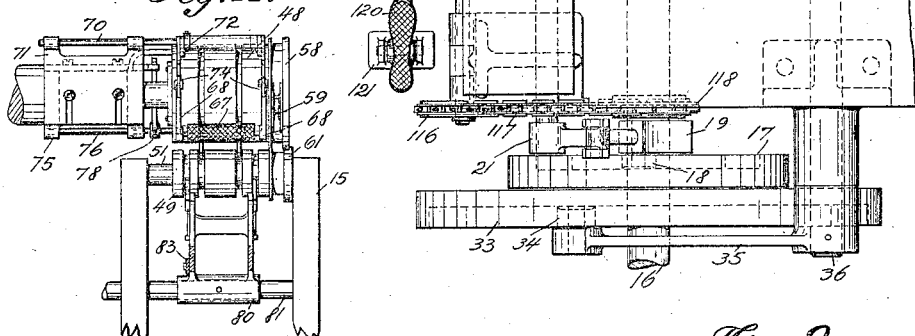
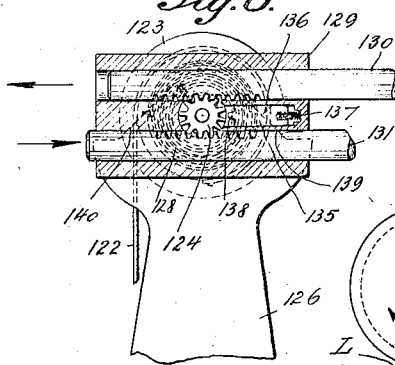
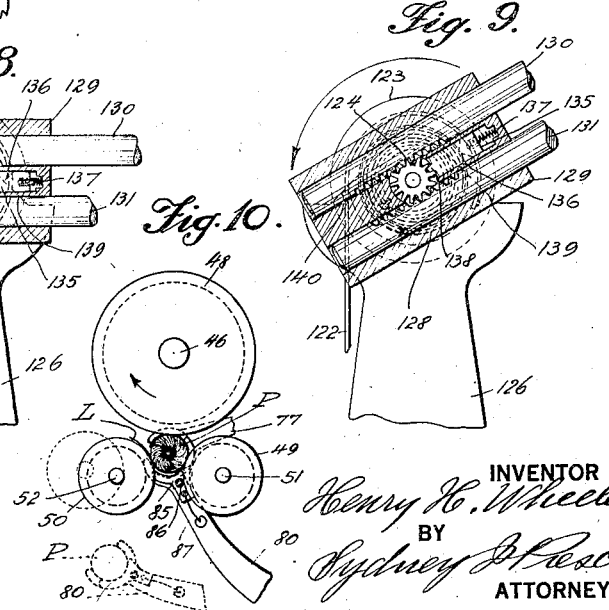

Feb. 25, 1930.  H. H. WHEELER  1,748,593
LABELING AND CARTONING DEVICE FOR PACKAGING MACHINES
Filed June 8, 1927  3 Sheets-Sheet 3
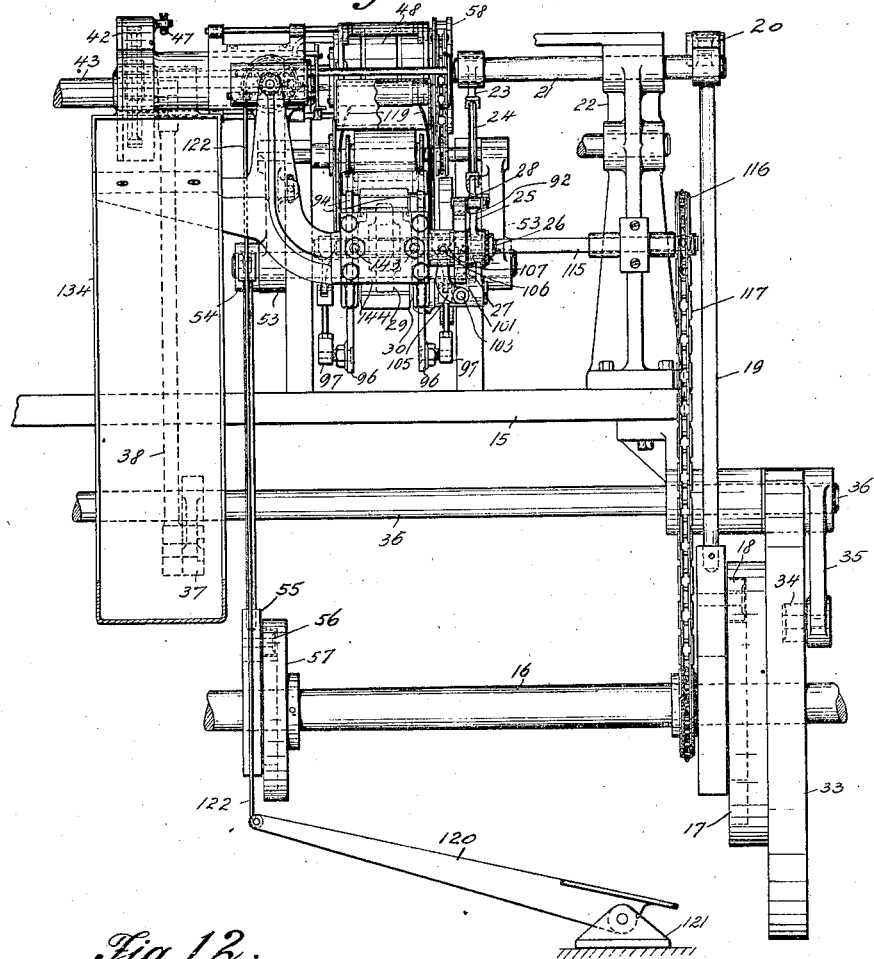
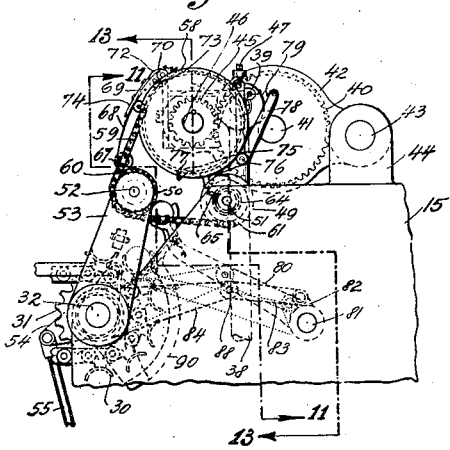
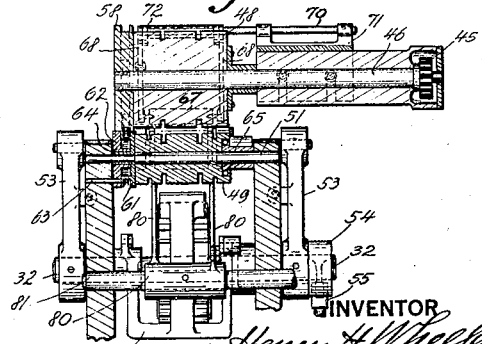
INVENTOR
Henry H Wheeler
BY
Sydney H Prescott
ATTORNEY Patented Feb. 25, 1930

1,748,593

UNITED STATES PATENT OFFICE

HENRY H. WHEELER, OF BROOKLYN, NEW YORK, ASSIGNOR TO AMERICAN MACHINE & FOUNDRY COMPANY, A CORPORATION OF NEW JERSEY

LABELING AND CARTONING DEVICE FOR PACKAGING MACHINES

Application filed June 8, 1927. Serial No. 197,305.

This invention relates to an improvement in a labeling and cartoning device for packaging machines, particularly for those making cylindrical packages.

Its underlying object is the production of such a device wherein the packages are supplied with labels wrapped circumferentially about them in such manner that all labels face in the same direction; and wherein the labeled packages are assembled in rows and the rows loaded into cartons; and wherein the loaded cartons are ejected and their position reversed in transit to make them ready to receive their lids or covers.

The labels are fed into the machine by clamping jaws which deliver them over the tops of two horizontally mounted supporting rollers, the package being placed upon the label between the two supporting rollers. A rubber roller then moves downward on the center of the package and by its rolling action, in conjunction with a pair of guides, wraps the label around the package. One end of the label is supplied with a strip of paste which seals the label on overlapping its other end at the termination of its controlled rolling motion, the label rollers being connected by a chain permitting only a definite number of revolutions to take place, with the result that every package stops with the label facing in the same direction. One of the supporting rollers then moves out of operative position to provide a fairway for discharge of the labeled article from the group of rollers position, and simultaneously a transfer arm grips the finished package and carries it to a conveyor. The pressure roller then moves out of operative position to provide a fairway for the introduction of an unlabeled package. After a number of labeled packages have been transferred to the conveyor, a plurality of said packages is lifted as a row into an inverted carton which rests on oppositely disposed springs. The springs are pushed aside by the passing packages and guide the latter into the carton. As soon as one row of packages has passed the springs, the latter return to their original position and form a support for the packages in the carton, which then rests on the packages inserted and forming the first row. In the meantime, the delivery of labeled packages to the conveyor has proceeded and goes on until the required number of packages for the second row is reached; whereupon, the lifting means raises this second row past the springs into the carton. The springs, going back to their normal position, then support the second row on which then rests the first row supporting the carton. This action is continued until the carton contains the required number of rows of packages, when the filled carton is gripped by a transfer device and ejected, the position of the carton being reversed in transit and deposited in a chute along which it slides out of the machine.

In the accompanying drawings, in which like characters of reference indicate the same or like parts, Fig. 1 is a side elevation of a labeling and cartoning device constructed in accordance with the invention; Figs. 2 and 3 are respectively a plan view and an end elevation of the same; Figs. 4 to 7 are elevations illustrating the different steps in carton transfer; Figs. 8 and 9 are elevations respectively showing the gripping mechanism of the transfer device in unlocked position and in locked position; Fig. 10 is a detailed view showing the operation of the package gripping fingers; Fig. 11 is an end elevation of the label-applying mechanism taken on the line 11—11 of Fig. 12; Fig. 12 is a side elevation of the label rolling and package transferring device; and Fig. 13 is a cross section through the label rolling and package transfer device, taken on the line 13—13 in Fig. 12.

In carrying the invention into effect, there is provided means for successively applying labels to articles, means for assembling the labeled articles in rows, and means for loading the assembled rows in the cartons.

In the best constructions contemplated, there is further provided means for ejecting the loaded cartons and for reversing their positions in transit; said applying means includes label feeding means and means for rotating the articles to wind the labels circumferentially thereabout; said assembling means includes a conveyor, and means for transferring the articles from said applying means to said conveyor; and said loading means includes a carton support, and means for successively transferring rows of articles from said assembling means into a carton on said support. The above mentioned means and parts may be widely varied in construction within the scope of the claims, for the specific device selected to illustrate the invention is but one of many possible concrete embodiments of the same. The invention therefore is not to be restricted to the precise details of the structure shown and described.

Referring to the drawings, the labeling and cartoning device is mounted on the main frame 15 of a packaging machine in connection with which it is used and is driven from a drive shaft 16 on which is mounted a cam 17 acting upon a roller 18 mounted on a forked rod 19 pivoted to a lever 20 mounted on a shaft 21. The latter is supported in a pedestal 22 and carries an arm 23 which, through an arm 24, is connected with a lever 25 fulcrumed on a shaft 26 carrying a ratchet 27. The lever 25 is provided with a pawl 28, receiving reciprocating motion from the arm 23 and imparting, through the ratchet 27, a step-by-step motion to the shaft 26, on which is mounted a sprocket wheel 29, supporting and driving a conveyor chain 30, also running over an idler sprocket 31 on a shaft 32.

On the shaft 16 is also secured a cam 33 which, through a roller 34, actuates a lever 35 mounted on a shaft 36. The latter carries a lever 37, to which is hinged a rod 38 connected, through a pin 39, to a gear 40 mounted on a shaft 41. The shaft 41 is supported in a housing 42 pivoted on a rod 43 supported in a lug 44 of the main frame 15. The gear 40, which is operated by the rod 38, meshes with the gear 45 mounted on a shaft 46 also supported in the housing 42. The pin 39 projects through a slot in the housing 42. The gear 40 drives the gear 45 on the shaft 46, on which is also mounted a rubber roller 48 pressing against the label L of the package P resting on the supporting rollers 49 and 50. The roller 49 is mounted on a shaft 51 supported in the main frame 15; and the roller 50 is mounted on a shaft 52, held by the swingable arms 53 fastened to the shaft 32, as seen in Figs. 12 and 13. To the shaft 32 is attached a lever 54 operated through a forked lever 55 from a roller 56 engaging a cam 57 on the shaft 16. The arms 53 swing the roller 50 out of operative position to provide a fairway through which a labeled package may be transferred to the conveyor 30.

On the shaft 46 is mounted a chain roller 58 to which is pinned one end of a chain 59 running over a sprocket 60 on the shaft 52 of the swingable arms 53, its other end being fastened to a flange roller 61 on the shaft 51. A stationary flange 62, attached by a pin 63 to the main frame 15, faces the flange roller 61 and thereby forms a housing in which a clock spring 64 is mounted. One end of this clock spring is fastened to the flange roller 61, and the other to the stationary flange 62, the spring thus keeping the chain 59 in tension. On the shaft 51 is mounted a ball clutch 65 engaging the roller 49 and permitting a unidirectional turning of the latter only while running free on the shaft 51.

The label L is delivered to the rolling device by two sliding grip jaws 66 of well known construction and operation, and which place the label on the two supporting rollers 49 and 50. A little paste is applied to one end of the label by a paste roller 67 mounted in links 68 pivoted on levers 69 fulcrumed on a shaft 70 supported in the bearing plate 71 of the housing 72. On the shaft 70 is mounted a lug 72 having a pin 73 acting as a stop for the levers 69. To the latter is fastened a blade spring 74 overlapping the links 68 in order to give the latter a greater flexibility, but always compelling them to return to their normal position. To the housing 42 is fastened another bearing plate 75 supporting a shaft 76 to which are pivoted fingers 77 which guide the incoming label L around the package. In order to fit the label tightly around the package, the shaft 76 has an arm 78 which is equipped with a tension spring 79 secured to the bearing plate 75.

After the label has been placed upon the two supporting rollers 49 and 50, the package P may be introduced and caused to rest on the label. The pressure roller 48, which during this transfer is in its raised or nonoperative position, will then descend immediately upon the introduction of the package and will press the guided end of the label L upon the package and then set the package rolling. The label, guided by the fingers 77, is wound circumferentially around the package while under the pressure of the roller 48. The latter turns only a definite number of revolutions, so that the packages will be stopped with the labels facing in the desired direction. After the rolling process is completed, the arms 53 move the roller 50 out of operative position and allow the grip fingers 80 to transfer the labeled package to the conveyor 30.

The grip fingers 80 are pivoted on a shaft 81 having a lug 82 which, through a link 83, is connected to a lever 84 mounted on the shaft 32, and follows the movement of the same which corresponds with that of the arms 53. Each grip finger 80 has a lock finger 85, Fig. 10, pivoted on a pin 86. The finger 85 is held in place by a leaf spring 87 which, when bent to one side, keeps the finger 85 locked on a package, as shown in dotted lines, and when bent to the other side, keeps it open to receive a package, as shown in full lines. The link 83 and lever 84 are loosely connected, through a pin 88, and so arranged that in the rolling position of the package, the pin 88 is below the center line from the shaft 32 to the pin 89 connecting the link 83 to the lug 82, so that when the lever 84 moves upwardly, the grip fingers 80 will also move upwardly, thereby pressing the lock finger 85 against the package P and causing the spring 87 to snap over center and grip the package. As soon as the pin 88 has passed the aforesaid center line, the continued upward motion of the lever 84 causes the fingers 80 to move downward with the gripped package. After the package has reached the conveyor, the fingers 80 continue their downward movement a little longer, thereby pressing the locked finger 85 against the stationary package and thus pushing over the spring 87 and disengaging the package which is then free to be removed by the conveyor.

The conveyor chain 30 is equipped with pockets of suitable shape to prevent turning or displacement of packages. The latter are guided during the first forward step of the conveyor by a guide arm 90 pivoted on the shaft 32. The shaft 32 is provided with a lever 91 connected, through a rod 92, to the lever 25 which drives the conveyor chain in a step-by-step movement along two grooved supporting rollers 93 extending between the sprockets 29 and 31.

When the number of packages required for one row in the carton have been advanced into the carton loading position of the conveyor, lifting bars 94 raise the labeled packages into the carton marked 95. The lifting bars 94 are carried by slide rods 96 which, through links 97, are connected to levers 98, carried by a shaft 99. Lugs 100, attached to the frame 15 and provided with suitable channels, guide the slide rods 96 in their reciprocating movement. The shaft 99 has a clutch 101 operated from the forked lever 102 mounted on a shaft 103 supported in bearing brackets 104 and 112. On the shaft 103 is mounted a lever 105 having a roller 106 engaging the side surface of the ratchet 27 which is provided with a projection 107. Once in every revolution of the ratchet 27, this projection 107 lifts the roller 106, thereby actuating the lever 105 which imparts its motion to the forked lever 102, causing the clutch 101 to engage the shaft 99 with a pinion 108 which receives a rocking motion from a gear sector 109 mounted on a shaft 110. The lever 105 is held in tension against the ratchet 27 by a spring 111 attached to the shaft 103 of the bearing 112. The shaft 110 is actuated through a cam lever 113 from a cam 114 mounted on a shaft 115. The latter carries a sprocket 116 and is driven through a chain 117 from a sprocket 118 mounted on the shaft 16. When the clutch 101 is in engagement and the pinion 108 turns in one direction, it lifts the lever 98 and raises the lifting bars 94 into engagement with the packages, Fig. 4. In being pushed up, the packages pass between the two spring plates 119 which open up and guide the packages into the carton 95, which rests upon the end of said spring plates. The lifting bars 94 raise the packages until they have passed the spring plates 119, thereby lifting the carton 95. Then the ends of the spring plates return to their normal position, forming the support for the packages, Fig. 5. After the required number of rows of packages has been lifted into the inverted carton in this manner, the latter must be turned into upright position without disturbing the orderly arrangement of the packages contained therein. To do this, the operator steps on the foot lever 120, which is pivoted in a bracket 121, and through a belt 122 or other flexible connector, is connected to a wheel 123 mounted on a shaft 124 supported in bearing brackets 125 and 126. The shaft 124 has teeth cut in it between its bearings, Figs. 8 and 9. The bearing bracket 126 has an extension bushing 127, to which is fastened one end of a clock spring 128, the other end of said clock spring being attached to the wheel 123. Between the brackets 125 and 126 is loosely mounted the ejecting frame 129, having two clamp rods 130 and two clamp rods 131. The clamp rods 130 and 131 on one end have teeth which are in engagement with the teeth of the shaft 124. The other ends of the rods 130 are connected by a clamping plate 132, and the other ends of the rods 131 are connected to a clamping plate 133. The clamp rods 130 and 131 are so mounted that when the shaft 124 turns in one direction, the clamping plates 132 and 133 are moved toward each other, and when the shaft 124 turns in the other direction, they move away from each other. So, as soon as the operator steps on the foot lever 120, the wheel 123 and shaft 124 begin to turn and the clamping plates 132 and 133 move toward each other and clamp the filled carton between them. By continuing the downward movement of the foot lever 120. the ejector frame 129 is then turned over, delivering the carton right-side-up into the chute 134, along which it is slid from the machine.

When the operator releases the foot lever 120, the clock spring 128 pulls back the wheel 123 and shaft 124, thereby causing the teeth of the shaft 124 to move the rods 130 and 131 away from each other and open the clamp plates 132 and 133, freeing the carton. In order to prevent opening of the clamp plates 132 and 133 while ejecting and reversing the carton, the ejector is equipped with a lock dog 135 slidably mounted in the frame 129 and having a V-shaped nose 136, Figs. 8 and 9. In behind the dog 135 is mounted a compressing spring 137 which presses the dog 135 against the teeth of the shaft 124. The front of the dog has a tooth 138 which, in the locking position, engages the tooth of the shaft 124 and prevents the latter from turning, thus keeping the clamp plates 132 and 133 closed. When the frame 129 rests in the horizontal position shown in Fig. 8, the shaft 128 is free to move, one side of the nose 136 having engaged with one inclined face 139 on the bracket 126 shortly before the ejector frame has arrived in this position, and having caused the dog 135 to slide toward the spring 137, thereby pressing the same and disengaging the tooth 138. As soon as the frame 129 leaves the horizontal position to eject and reverse a carton, Fig. 9, the nose 136 lifts off the inclined face 139, permitting the spring 137 to push the dog 135 forward and drive the tooth 138 into engagement, thereby locking the clamp plates 132 and 133 in gripping position. When the carton is completely turned over, the frame 129 is again in horizontal position, but 180 degrees from that shown in Fig. 8, and the carton is released, the other side of the nose 136 having engaged the inclined face 140 on the opposite side of the bracket 126 shortly before reaching the second horizontal position, whereby the dog 135 has been forced to slide back and release the shaft 124 which then was free to open the clamp plates 132 and 133.

The sprocket shaft 26 is supported in a bearing 141, which is slidably mounted on bars 142 of the frame 15, so that the tension of the conveyor chain 30 can be regulated by adjusting the screws 143 in the cross bar 144.

In view of the foregoing, a detailed description of the device is deemed unnecessary, and is therefore omitted in the interest of brevity.

What is claimed is:

1. The combination with means for successively rotating articles and thereby applying labels thereto, of means for assembling the labeled articles in rows, means for supporting an inverted carton and its contents, and means for successively lifting said rows into said carton.

2. The combination with means for successively rotating articles and thereby applying labels thereto, of means for assembling the labeled articles in rows, means for supporting an inverted carton and its contents, means for successively lifting said rows into said carton, and means for ejecting a loaded carton and reversing its position in transit to prepare it for receiving its lid.

3. The combination with means for successively rotating articles and thereby applying labels thereto, of means for assembling the labeled articles in rows, means for supporting an inverted carton and its contents, and means for successively lifting said rows into said carton, said rotating means including a group of coacting rollers supporting and rotating the articles.

4. The combination with means for successively rotating articles and thereby applying labels thereto, of means for assembling the labeled articles in rows, means for supporting an inverted carton and its contents, and means for successively lifting said rows into said carton, said rotating means including a stationary supporting roller, a movable supporting roller, and a movable pressure roller engaging the article lying therebetween.

5. The combination with means for successively rotating articles and thereby applying labels thereto, of means for assembling the labeled articles in rows, means for supporting an inverted carton and its contents, and means for successively lifting said rows into said carton, said assembling means including a conveyor, and means for successively transferring articles from said rotating means to said conveyor.

6. The combination with means for successively rotating articles and thereby applying labels thereto, of means for assembling the labeled articles in rows, means for supporting an inverted carton and its contents, and means for successively lifting said rows into said carton, said assembling means including an intermittently moving conveyor, and a swinging arm for successively transferring articles from said rotating means to said conveyor when the latter is stationary.

7. The combination with means for successively rotating articles and thereby applying labels thereto, of means for assembling the labeled articles in rows, means for supporting an inverted carton and its contents, and means for successively lifting said rows into said carton, said lifting means including a reciprocating device rising from said assembling means when a row of articles thereon is completed.

8. The combination with means for successively rotating articles and thereby applying labels thereto, of means for assembling the labeled articles in rows, means for supporting an inverted carton and its contents, and means for successively lifting said rows into said carton, said supporting means including a series of oppositely disposed row retaining springs between which said lifting means raises rows of articles.

9. The combination with means for successively rotating articles and thereby applying labels thereto, of means for assembling the labeled articles in rows, means for supporting an inverted carton and its contents, means for successively lifting said rows into said carton, and means for ejecting a loaded carton and reversing its position in transit to prepare it for receiving its lid, said ejecting means including means for clamping a loaded carton, and means for swinging said clamping means.

10. The combination with means for assembling articles in rows, of means for stationarily supporting an inverted carton and its contents, and means for successively lifting said rows into said carton.

11. The combination with means for assembling articles in rows, of means for supporting an inverted carton and its contents, means for successively lifting said rows into said carton, and means for ejecting the loaded carton and reversing its position in transit to prepare it for receiving its lid.

12. Means for applying a label to an article, comprising a group of two supporting rollers and a pressure roller for rotating the article during the applying operation, said pressure roller being movable out of operative position to provide a fairway for introduction of an unlabeled article into said group.

13. Means for applying a label to an article, comprising a group of two supporting rollers and a pressure roller for rotating the article during the applying operation, one of said supporting rollers being movable out of operative position to provide a fairway for discharge of a labeled article from said group.

14. Means for applying a label to an article, comprising a group of two supporting rollers and a pressure roller for rotating the article during the applying operation, said pressure roller being movable out of operative position to provide a fairway for introduction of an unlabeled article into said group, and one of said supporting rollers being movable out of operative position to provide a fairway for discharge of a labeled article from said group.

15. Means for assembling articles in a row, comprising a conveyor, article carrying means for successively loading the articles into said conveyor, and means for simultaneously lifting a plurality of the articles from said conveyor at intervals.

16. Means for loading assembled rows of articles into a carton, comprising means for stationarily supporting a carton in inverted position, and means for successively lifting assembled rows of articles into said carton.

17. Means for loading assembled rows of articles into a carton, comprising a series of oppositely disposed row retaining springs for supporting a carton in inverted position and for also supporting its contents, and means for successively lifting assembled rows of articles between said springs into said carton.

18. Means for ejecting loaded cartons, comprising means for clamping an inverted and loaded carton, and means for moving said clamping means to eject the carton and to reverse its position in transit to prepare it for receiving its lid.

19. Means for ejecting loaded cartons, comprising a pair of oppositely disposed clamps for engaging opposite sides of an inverted carton and its contents, means for oppositely moving said clamps to open and close them, and means for swinging said clamps to eject the carton and to reverse its position in transit.

In testimony whereof, I have signed my name to this specification.

HENRY H. WHEELER.